No. 749,969. PATENTED JAN. 19, 1904.
J. K. MUNSON.
PACKING FOR MANHOLES.
APPLICATION FILED JULY 25, 1903.
NO MODEL.

WITNESSES:
Ross W. Tulloch
H. N. Barnes

INVENTOR
J. K. Munson
BY
Pierre Barnes
ATTORNEY

No. 749,969. Patented January 19, 1904.

UNITED STATES PATENT OFFICE.

JOHN K. MUNSON, OF HOUGHTON, WASHINGTON.

PACKING FOR MANHOLES.

SPECIFICATION forming part of Letters Patent No. 749,969, dated January 19, 1904.

Application filed July 25, 1903. Serial No. 166,936. (No model.)

*To all whom it may concern:*

Be it known that I, JOHN K. MUNSON, a citizen of the United States, residing at Houghton, in the county of King and State of Washington, have invented certain new and useful Improvements in Packing for Manholes, of which the following is a specification, reference being had therein to the accompanying drawings.

This invention relates to gaskets used for packing the joints below the manhole-covers of steam-boilers or the like. Packings for this class of joints are commonly made of flat sheets of rubber or fibrous material, which are usually cemented in place, but have proved to be very unreliable, inasmuch as the packing material or the cement deteriorates under the high temperatures to which they are subjected, and in consequence are oftentimes blown out by the steam. Furthermore, when it becomes necessary for any reason to remove the manhole-cover such packing is so firmly secured to both the boiler-plate and the cover as to cause the gasket to break and necessitates its renewal at frequent intervals.

The object of my invention is to overcome the above-noted and other objectionable features by the construction of a gasket that will retain its seat without cementing it to either the boiler or the cover and withstand any amount of steam-pressure that is likely to be generated without danger of its being blown out. I attain these results by the adaptation of material and construction hereinafter described, and illustrated in the accompanying drawings, in which—

Figure 2:
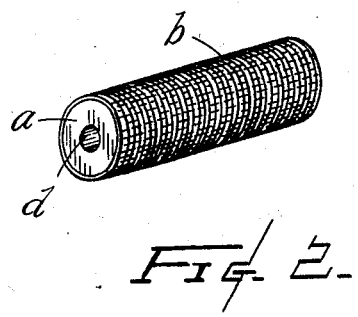
Figure 1:
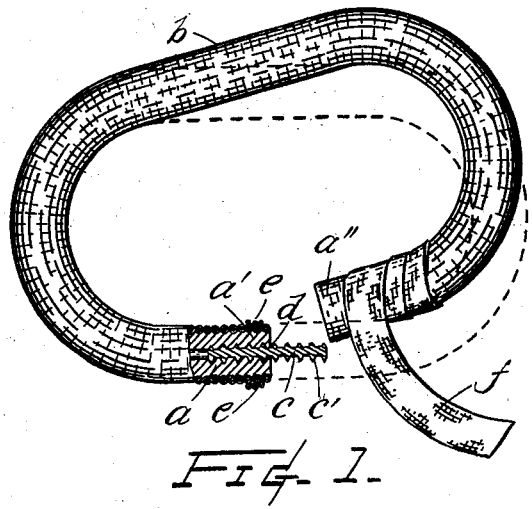

Figure 1 is a plan view, partly in section, of a gasket constructed according to my invention; and Fig. 2 is an enlarged fragmentary perspective view of the gasket-stock.

Referring to the said drawings by letters, $a$ represents a hollow core of suitable elastic or flexible substance—such as rubber, asbestos, or other fibrous material—and is preferably made circular in cross-section. The outer peripheral surface of the core is covered by a jacket of metal gauze $b$. The stock formed as above described is cut to length suited to the joint being packed, and a pin or stud $c$, provided with a plurality of annular ridges $c'$, is inserted part way into the orifice $d$ of one of the core ends $a'$. This end of the core is now tightly bound to the said pin by means of wire $e$. (See Fig. 1.) The other end $a''$ of the stock is forced upon the stud and secured as aforedescribed, after which the union of the two ends is wrapped by a piece of tape $f$, previously smeared with an adhesive substance.

To use the gasket, it is placed beneath the cover and when the latter is drawn down by the securing-bolt embeds the wire-gauze intimately with the flexible core as the latter is flattened out under pressure, and so jacketed it will withstand displacement or disintegration.

Having described my invention, what I claim as new, and desire to secure by Letters Patent, is—

A packing consisting of a hollow flexible core, wire-gauze surrounding said core, a stud having a plurality of annular ridges secured within said core and having a portion thereof protruding without the core, wire tightly wound around said core to compress the same about said stud, and a tape wound around the ends of the core after the same are joined.

In testimony whereof I affix my signature in presence of two witnesses.

JOHN K. MUNSON.

Witnesses:
PIERRE BARNES,
H. N. BARNES.